(12) United States Patent
Smith

(10) Patent No.: US 7,044,860 B2
(45) Date of Patent: May 16, 2006

(54) SLIP JOINT FOR VEHICLE DRIVESHAFT ASSEMBLY

(75) Inventor: Johnny N. Smith, Toledo, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 0 days.

(21) Appl. No.: 10/403,828

(22) Filed: Mar. 31, 2003

(65) Prior Publication Data
US 2004/0192449 A1    Sep. 30, 2004

(51) Int. Cl.
*F16C 3/03* (2006.01)
(52) U.S. Cl. .................. 464/162; 403/109.5
(58) Field of Classification Search .......... 464/162; 403/109.5, 359.5, 359.1, 109.1
See application file for complete search history.

(56) References Cited

U.S. PATENT DOCUMENTS

| | | | |
|---|---|---|---|
| 2,158,757 A | 5/1939 | Kuestermeier | |
| 3,697,102 A | 10/1972 | Falke | |
| 4,000,919 A | 1/1977 | Edwards et al. | |
| 4,022,499 A | 5/1977 | Holmes et al. | |
| 4,082,326 A | 4/1978 | Bryson | |
| 4,124,235 A | 11/1978 | Grahl et al. | |
| 4,203,306 A * | 5/1980 | Sehlbach et al. | 464/162 |
| 4,346,923 A | 8/1982 | Smith et al. | |
| 4,379,707 A * | 4/1983 | Fisher | 464/162 |
| 4,445,714 A | 5/1984 | Kisiel, III | |
| 4,531,766 A | 7/1985 | Crase | |
| 4,624,483 A | 11/1986 | Stromberg | |
| 4,655,486 A | 4/1987 | Tarnay et al. | |
| 4,667,530 A * | 5/1987 | Mettler et al. | 74/493 |
| 4,693,316 A | 9/1987 | Ringgenberg et al. | |
| 5,207,459 A | 5/1993 | Glover | |
| 5,344,195 A | 9/1994 | Parimore, Jr. et al. | |
| 5,433,551 A * | 7/1995 | Gordon | 403/377 |
| 5,460,574 A * | 10/1995 | Hobaugh | 464/162 |
| 5,466,019 A | 11/1995 | Komolrochanaporn | |
| 5,645,366 A * | 7/1997 | Ishibashi et al. | 403/359.5 |
| 5,918,913 A * | 7/1999 | Lewis et al. | 285/148.14 |
| 6,343,993 B1 * | 2/2002 | Duval et al. | 464/167 |
| 6,357,802 B1 | 3/2002 | Nozato et al. | |
| 6,620,050 B1 * | 9/2003 | Park | 464/162 |

* cited by examiner

*Primary Examiner*—Kenneth Thompson
(74) *Attorney, Agent, or Firm*—MacMillian, Sobanski & Todd, LLC

(57) ABSTRACT

A slip joint, such as for use in a vehicular driveshaft assembly, includes a first member having a plurality of male splines provided thereon and a second member having a plurality of female splines provided thereon. The male splines cooperate with the female splines so as to connect the first and second members together for concurrent rotational movement and for relative axial movement. A wedge member is disposed between portions of the first and second members to take up looseness therebetween and to adjustably control the amount of force that is required to be exerted in order to effect relative axial movement. The wedge member includes a body portion having a plurality of leg portions extending therefrom. The wedge member is positioned such that the leg portions are received within an annular space between the first and second members. A cap can be provided for facilitating the positioning of the wedge member relative to the first and second members and for retaining the wedge member in a desired position relative to the two members. The cap can be threaded onto one of the members such that rotation of the cap causes the cap and the wedge member to move axially relative to the first and second members.

19 Claims, 3 Drawing Sheets

SLIP JOINT FOR VEHICLE DRIVESHAFT ASSEMBLY

BACKGROUND OF THE INVENTION

The invention relates in general to driveshaft assemblies, such as are commonly found in the drive train systems of most vehicles. In particular, this invention relates to an improved structure for a sliding spline type of slip joint for use in such a vehicular driveshaft assembly.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must a typical drive train system accommodate a limited amount of angular misalignment between the source of rotational power and the rotatably driven device, but it must also typically accommodate a limited amount of relative axial movement therebetween. For example, in most vehicles, a small amount of relative axial movement frequently occurs between the engine/transmission assembly and the axle assembly when the vehicle is operated. To address this, it is known to provide a slip joint in the driveshaft assembly. A typical slip joint includes first and second members that have respective structures formed thereon that cooperate with one another for concurrent rotational movement, while permitting a limited amount of axial movement to occur therebetween.

A typical sliding spline type of slip joint includes male and female members having respective pluralities of splines formed thereon. The male member is generally cylindrical in shape and has a plurality of outwardly extending splines formed on the outer surface thereof. The male member may be formed integrally with or secured to a first end of the driveshaft assembly described above. The female member, on the other hand, is generally hollow and cylindrical in shape and has a plurality of inwardly extending splines formed on the inner surface thereof. The female member may be formed integrally with or secured to a second end of the driveshaft assembly described above. To assemble the slip joint, the male member is inserted within the female member such that the outwardly extending splines of the male member cooperate with the inwardly extending splines of the female member. As a result, the male and female members are connected together for concurrent rotational movement. However, the outwardly extending splines of the male member can slide relative to the inwardly extending splines of the female member to allow a limited amount of relative axial movement to occur between the engine/transmission assembly and the axle assembly of the drive train system.

One problem that has been experienced with sliding spline type of slip joints is that undesirable radially extending gaps can exist between cooperating splines provided on the male and female members thereof. These gaps can occur as a result of manufacturing tolerances in the formation of the male and female splined members and usually result in an undesirable amount of looseness therebetween during operation. Such looseness can allow the splined members to extend at a slightly cantilevered angle relative to one another, a condition that is often referred to a broken back. Known solutions to the problems of broken back have been found to be relatively difficult, costly, and time consuming to employ. Thus, it would be desirable to provide an improved structure for a sliding spline type of slip joint that can minimize or eliminate the occurrence of broken back. Additionally, in some instances, it is desirable to control the amount of force that is required to be exerted in order to effect relative axial movement between the male and female members of the slip joint. It would, therefore, also be desirable to provide an improved structure for a sliding spline type of slip joint that allows the amount of this force to be controlled in a simple and inexpensive manner.

SUMMARY OF THE INVENTION

The invention relates to an improved structure for a slip joint, such as is commonly used in a driveshaft assembly of a vehicular drive train system, that minimizes or eliminates the occurrence of broken back and allows the amount of force that is required to be exerted in order to effect relative axial movement between the male and female members of the slip joint to be controlled in a simple and inexpensive manner. The slip joint includes a first member having a plurality of male splines provided thereon and a second member having a plurality of female splines provided thereon. The male splines cooperate with the female splines so as to connect the first and second members together for concurrent rotational movement and for relative axial movement. A wedge member is disposed between portions of the first and second members to take up looseness therebetween and to adjustably control the amount of force that is required to be exerted in order to effect relative axial movement. The wedge member includes a body portion having a plurality of leg portions extending therefrom. The wedge member is positioned such that the leg portions are received within an annular space between the first and second members. A cap can be provided for facilitating the positioning of the wedge member relative to the first and second members and for retaining the wedge member in a desired position relative to the two members. The cap can be threaded onto an outer surface of one of the members such that rotational movement of the cap causes the cap and the wedge member to move axially relative to the first and second members.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
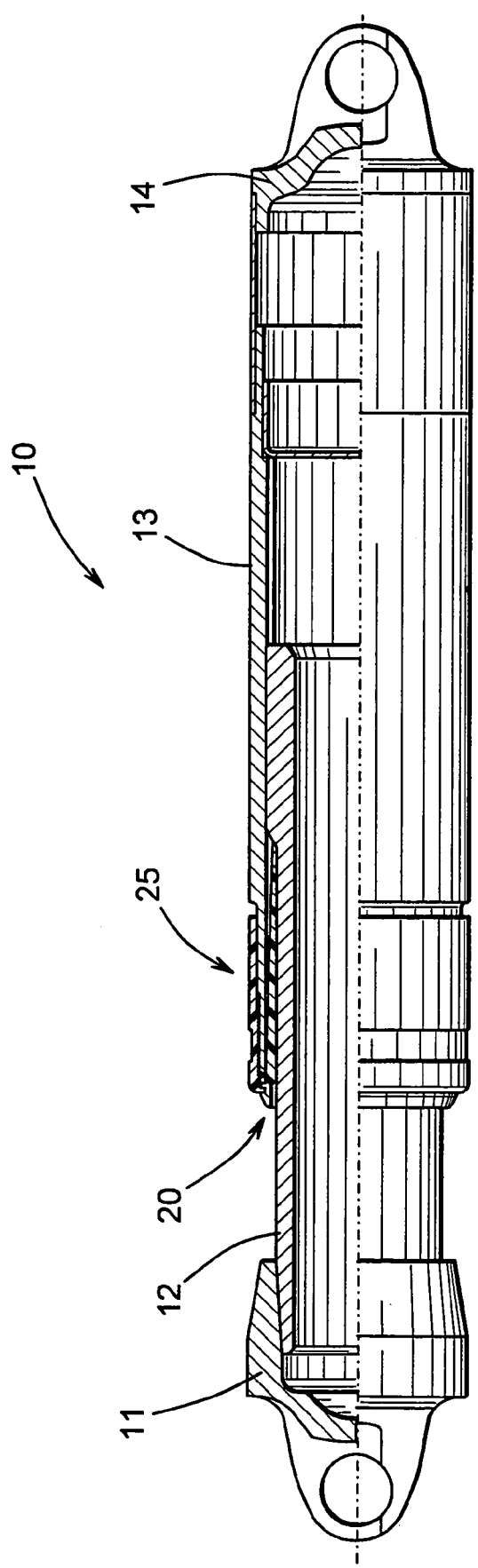
FIG. 1 is a side elevational view, partially in cross section, of a driveshaft assembly including a sliding spline type of slip joint in accordance with this invention.

Referring now to the drawings, there is illustrated in FIG. 1 a driveshaft assembly, indicated generally at 10, in accordance with this invention. The illustrated driveshaft assembly 10 may, for example, be used in a vehicle drive train system, such as described above. However, the illustrated driveshaft assembly 10 may be used in any desired environment for any purpose. The driveshaft assembly 10 includes a first end fitting 11 that is secured to a first end of a first driveshaft section 12. The first end fitting 11 may, for example, be a conventional tube yoke including a pair of yoke arms and a hollow cylindrical sleeve portion. The yoke arms of the first end fitting 11 are adapted to form a portion of a first universal joint, such as described above. The hollow cylindrical sleeve portion of the first end fitting 11 extends about the first end of the first driveshaft section 12 and can be secured thereto in any conventional manner, such as by welding. The first driveshaft section 12 is generally hollow and cylindrical in shape (although such is not required) and includes a second end having a plurality of axially extending male splines 12a formed or otherwise provided on an outer surface thereof.

Figure 3:
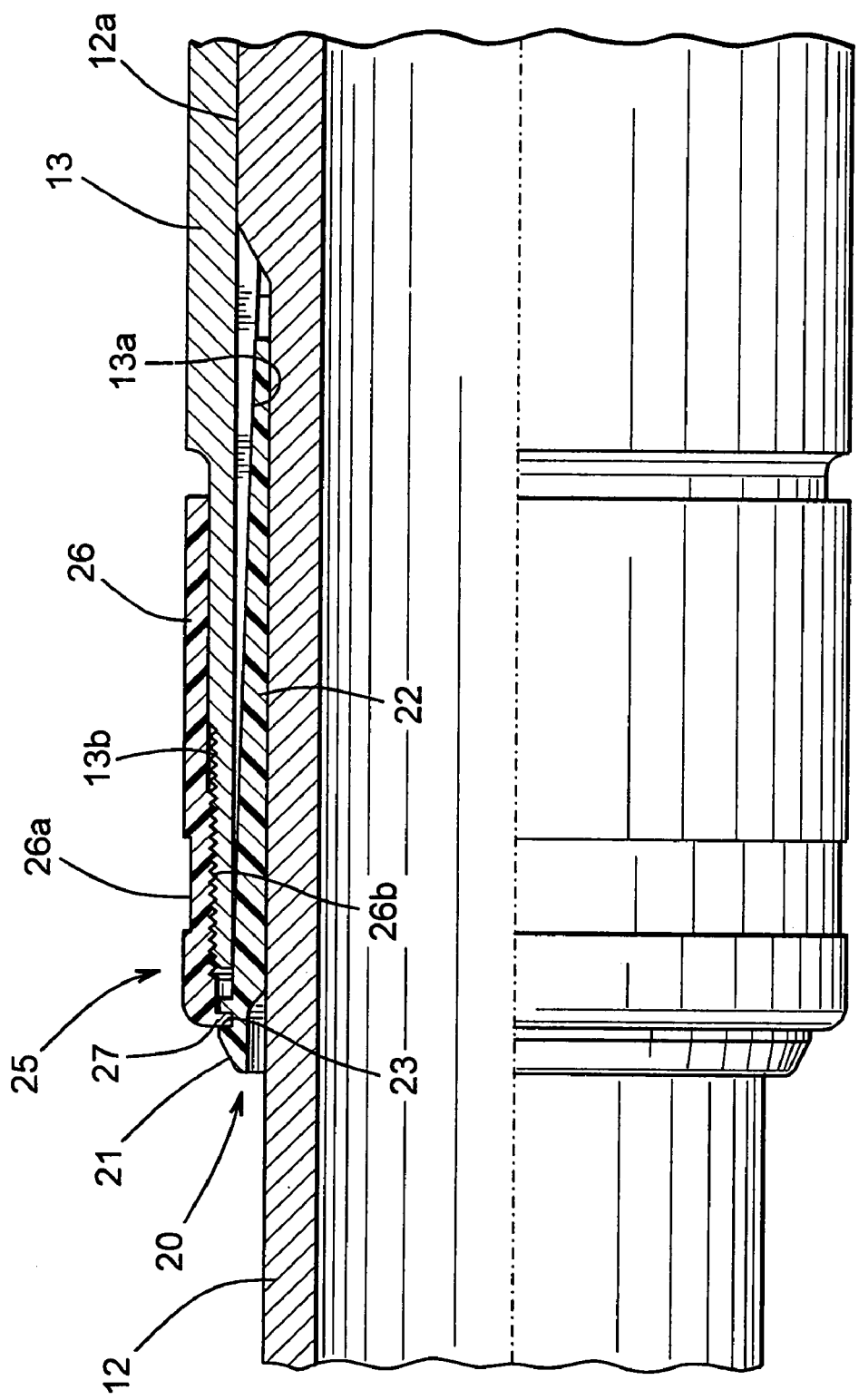
FIG. 3 is a further enlarged side elevational view, partially in cross section, of a portion of the driveshaft assembly illustrated in FIGS. 1 and 2.

The driveshaft assembly 10 also includes a second driveshaft section 13 that is connected to the first driveshaft section 12 for rotation therewith. The second driveshaft section 13 is also generally hollow and cylindrical in shape (although such is not required) and includes a first end having a plurality of axially extending female splines 13a formed or otherwise provided on an inner surface thereof. If desired, the end portions of the female splines 13a adjacent to the first end of the second driveshaft section 13 may be gradually tapered so as to blend smoothly with the inner surface of the second driveshaft section 13 at the first end thereof, as shown in FIG. 3. A helical thread 13b or similar structure is formed or otherwise provided on the outer surface of the first end of the second driveshaft section 13. The purpose for this helical thread 13b will be explained below. A second end fitting 14 is secured to a second end of the second driveshaft section 13. The second end fitting 14 may also, for example, be a conventional tube yoke including a pair of yoke arms and a hollow cylindrical sleeve portion. The hollow cylindrical sleeve portion of the second end fitting 14 extends within the second end of the second driveshaft section 13 and can be secured thereto in any conventional manner, such as by welding. The yoke arms of the second end fitting 14 are adapted to form a portion of a second universal joint, such as described above.

In a manner that is well known in the art, the second end of the first driveshaft section 12 is inserted telescopically within the first end of the second driveshaft section 13 to form a slip joint, as shown in FIGS. 1 and 3. When so inserted, the male splines 12a provided on the second end of the first driveshaft section 12 cooperate with the female splines 13a provided on the first end of the second driveshaft section 13. As a result, the first and second driveshaft sections 12 and 13 are connected together for concurrent rotational movement. At the same time, however, the cooperating male and female splines 12a and 13a permit at least a limited amount of relative axial movement to occur between the first driveshaft section 12 and the second driveshaft section 13.

Figure 2:
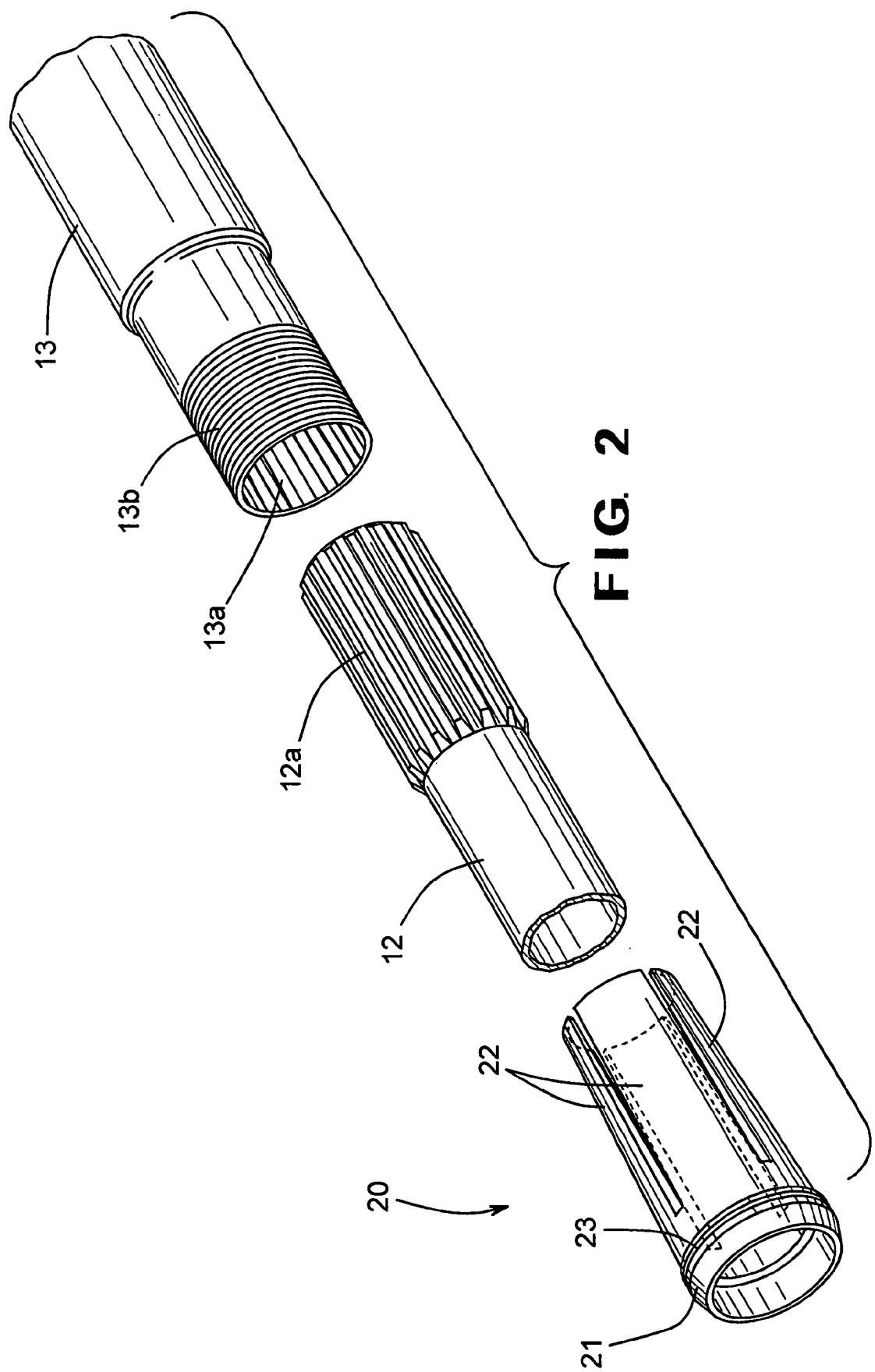
FIG. 2 is an enlarged exploded perspective view of several components of the driveshaft assembly illustrated in FIG. 1.

The driveshaft assembly 10 further includes an annular wedge member, indicated generally at 20, that is adapted to extend between a portion of the outer surface of the first driveshaft section 12 and a portion of the inner surface of the second driveshaft section 13. As best shown in FIGS. 2 and 3, the wedge member 20 is generally hollow and cylindrical in shape (although such is not required) and includes an annular body portion 21 having a plurality of leg portions 22 extending therefrom. The body portion 21 of the wedge member 20 has an annular groove 23 or similar structure formed in the outer surface thereof. The purpose for this annular groove 23 will be explained below. In the illustrated embodiment, the leg portions 22 all have the same shape, as best shown in FIG. 2. However, the leg portions 22 of the wedge member 21 may be formed having any desired shape or combination of shapes. Also, the illustrated leg portions 22 are gradually tapered as they extend axially outwardly from the body portion 21 from a maximum thickness adjacent to the body portion 21 to a minimum thickness at the ends thereof, as best shown in FIG. 3. However, the leg portions 22 need not be tapered in this manner or at all if desired. In the illustrated embodiment, the wedge member 20 has four of such leg portions 22 extending axially from the body portion 21. However, it will be appreciated that the wedge member 20 may have any desired number of such leg portions 22.

When the first and second driveshaft sections 12 and 13 are assembled together, the male splines 12a provided on the second end of the first driveshaft section 12 cooperate with the female splines 13a provided on the first end of the second driveshaft section 13 in the manner described above to form the slip joint. When so assembled, an annular space is defined between a portion of the outer surface of the first driveshaft section 12 (the portion of the first driveshaft section 12 that is located axially inwardly from the end having the male splines 12a provided thereon) and a portion of the inner surface of the second driveshaft section 13 (the portion of the second driveshaft section 13 wherein the female splines 13a are tapered). This annular space is preferably located outside of the region of the cooperating male and female splines 12a and 13a. The annular wedge member 20 is adapted to extend within this annular space to minimize or eliminate looseness between the first and second driveshaft sections 12 and 13, and further to adjustably control the amount of force that is required to be exerted in order to effect relative axial movement therebetween.

To accomplish this, the wedge member 20 is initially disposed about the first driveshaft section 12 such that the leg portions 22 thereof are facing toward the region of the cooperating male and female splines 12a and 13a. Then, the wedge member 20 is moved axially along the first driveshaft section 12 such that the leg portions 22 are received within the annular space defined between the outer surface of the first driveshaft section 12 and the inner surface of the second driveshaft section 13, as best shown in FIG. 3. As a result, the tapered leg portions 22 of the wedge member 20 engage the outer surface of the first driveshaft section 12 and the inner surfaces of the female splines 13a of the second driveshaft section 13. By properly positioning the wedge member 20 relative to the first and second driveshaft sections 12 and 13, the wedge member 20 occupies the annular space therebetween so as to minimize or eliminate looseness between the first and second driveshaft sections 12 and 13. Also, by adjusting the position of the wedge member 20 relative to the first and second driveshaft sections 12 and 13, the magnitude of the frictional engagement between these three components can be varied. Consequently, the amount of force that is required to be exerted in order to effect relative axial movement between the first and second driveshaft sections 12 and 13 can be adjustably controlled.

In the illustrated embodiment, a cap, indicated generally at 25, is provided for facilitating the positioning of the wedge member 20 relative to the first and second driveshaft sections 12 and 13 and for retaining the wedge member 20 in a desired relative position. The illustrated cap 25 includes a body portion 26 that is generally hollow and cylindrical in shape and a radially inwardly extending lip portion 27. If desired, an annular recessed area 26*a* may be formed or otherwise provided in the outer surface of the body portion 26 of the cap 25. The recessed area 26*a* can be used to facilitate the connection of one end of a conventional flexible boot (not shown) or similar sealing structure to prevent dirt, water, and other contaminants from entering into the region of the cooperating male and female splines 12*a* and 13*a*. The other end of the flexible boot would be supported on the outer surface of the first driveshaft section 12 in a conventional manner.

As best shown in FIG. 3, the inner surface of the body portion 26 of the cap 25 has a helical thread 26*b* or similar structure formed or otherwise provided thereon. The helical thread 26*b* of the cap 25 cooperates with the helical thread 13*b* that is provided on the outer surface of the first end of the second driveshaft section 13. As a result, rotational movement of the cap 25 relative to the second driveshaft section 13 simultaneously causes the cap 25 to move axially relative to the second driveshaft section 13. The direction of such axial movement will depend upon the direction of the rotation of the cap 25 relative to the second driveshaft section 13. The lip portion 27 of the cap 25 is adapted to extend within the groove 23 formed in the outer surface of the body portion 21 of the wedge member 20. Thus, rotational movement of the cap 25 causes the wedge member 20 to be moved axially relative to the first and second driveshaft sections 12 and 13, for the purposes discussed above. The rotational movement of the cap 25 can be effected in any desired manner, such as by hand or with the use of a tool.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip joint comprising:
    a first member having a plurality of male splines provided thereon;
    a second member having a plurality of female splines provided thereon, said male splines cooperating with said female splines so as to connect said first and second members together for concurrent rotational movement and for relative axial movement; and
    a wedge member including an annular body portion disposed about said first member and having a plurality of axially extending leg portions extending from said body portion between portions of said first and second members, each of said leg portions tapering from a maximum thickness adjacent to said body portion to a minimum thickness at respective ends thereof.

2. The slip joint defined in claim 1 wherein each of said leg portions is tapered from a maximum thickness to a minimum thickness.

3. The slip joint defined in claim 1 further including means for adjusting the position of said wedge member relative to at least one of said first and second members.

4. The slip joint defined in claim 1 further including a cap that is supported on one of said first and second members, said cap being connected to said wedge member for positioning said wedge member relative to said first and second members.

5. The slip joint defined in claim 4 wherein said cap includes a body portion that is supported on said one of said first and second members and a lip portion that is connected to said wedge member.

6. The slip joint defined in claim 5 wherein said wedge member has a groove formed therein, and wherein said lip portion of said cap extends into said groove.

7. The slip joint defined in claim 4 wherein said cap includes a body portion tat is connected to said one of said first and second members such that movement of said cap causes movement of said wedge member relative to said first and second members.

8. The slip joint defined in claim 7 wherein said body portion of said cap has a thread provided thereon that cooperates with a tread provided on said one of said first and second members.

9. The slip joint defined in claim 4 wherein said cap includes a body portion and a lip portion, said body portion being connected to said one of said first and second members such that movement of said cap causes movement of said wedge member relative to said first and second members, said lip portion being connected to said wedge member.

10. The slip joint defined in claim 9 wherein said wedge member has a groove formed therein, and wherein said lip portion of said cap extends into said groove.

11. The slip joint defined in claim 9 wherein said body portion of said cap has a thread provided thereon that cooperates with a thread provided on said one of said first and second members.

12. The slip joint defined in claim 1 further including means for retaining said wedge member in a position relative to at least one of said first and second members.

13. The slip joint defined in claim 1 wherein said first member is a first driveshaft section in a driveshaft assembly and said second member is a second driveshaft section in a driveshaft assembly.

14. A slip joint comprising:
    a first member having a plurality of male splines provided thereon;
    a second member having a plurality of female spines provided thereon, said male splines cooperating with said female splines so as to connect said first and second members together for concurrent rotational movement and for relative axial movement;
    a wedge member disposed between portions of said first and second members, said wedge member having a groove formed therein; and
    a cap supported on one of said first and second members, said cap including a body portion that is supported on said one of said first and second members and a lip portion that extends into said groove to connect said cap to said wedge member.

15. The slip joint defined in claim 14 wherein each of said leg portions is tapered from a maximum thickness to a minimum thickness.

16. The slip joint defined in claim 14 wherein said wedge member includes a body portion having said plurality of leg portions extending therefrom.

17. The slip joint defined in claim 16 wherein said each of said leg portions is tapered from a maximum thickness adjacent to said body portion to a minimum thickness at respective ends thereof.

18. The slip joint defined in claim 14 further including means for adjusting the position of said wedge member relative to at least one of said first and second members.

19. A slip joint comprising:
a first member having a plurality of male spines provided thereon;
a second member having a plurality of female splines provided thereon, said male spines cooperating with said female splines so as to connect said first and second members together for concurrent rotational movement and for relative axial movement; and
a wedge member including a plurality of axially extending, axially tapered leg portions that is disposed between portions of said first and second members.

* * * * *